United States Patent
Badawy et al.

(10) Patent No.: US 10,054,067 B2
(45) Date of Patent: Aug. 21, 2018

(54) USING ION CURRENT SIGNAL FOR ENGINE PERFORMANCE AND EMISSIONS MEASURING TECHNIQUES AND METHOD FOR DOING THE SAME

(71) Applicant: Wayne State University, Detroit, MI (US)

(72) Inventors: Tamer H. Badawy, Rochester Hills, MI (US); Fadi A. Estefanous, Warren, MI (US); Naeim A. Henein, Grosse Pointe Farms, MI (US)

(73) Assignee: Wayne State University, Detroit, MI (US)

( * ) Notice: Subject to any disclaimer, the term of this patent is extended or adjusted under 35 U.S.C. 154(b) by 208 days.

(21) Appl. No.: 14/380,993

(22) PCT Filed: Feb. 28, 2013

(86) PCT No.: PCT/US2013/028231
§ 371 (c)(1),
(2) Date: Aug. 26, 2014

(87) PCT Pub. No.: WO2013/130744
PCT Pub. Date: Sep. 6, 2013

(65) Prior Publication Data
US 2015/0300278 A1    Oct. 22, 2015

Related U.S. Application Data

(60) Provisional application No. 61/604,074, filed on Feb. 28, 2012.

(51) Int. Cl.
*F02D 35/02* (2006.01)
*G01M 15/10* (2006.01)
*F02D 41/14* (2006.01)

(52) U.S. Cl.
CPC ......... *F02D 35/021* (2013.01); *F02D 35/024* (2013.01); *F02D 41/1458* (2013.01);
(Continued)

(58) Field of Classification Search
CPC .............. F02D 35/021; F02D 41/1459; F02D 41/1458; F02D 41/1461; F02D 35/024;
(Continued)

(56) References Cited

U.S. PATENT DOCUMENTS 3,841,283 A * 10/1974 Wood .................. F02D 41/1446
                                                           123/676
3,874,171 A *  4/1975 Schmidt .................... F01N 3/18
                                                           123/672
(Continued)

FOREIGN PATENT DOCUMENTS

DE   10 2011 081 028 A1   2/2012
EP              115607 B1   8/1984
(Continued)

OTHER PUBLICATIONS

International Search Report for Application No. PCT/US2013/028231 dated May 20, 2013.
(Continued)

*Primary Examiner* — Joseph Dallo
(74) *Attorney, Agent, or Firm* — Brinks Gilson & Lione (57) ABSTRACT

A system and method is provided for the use of the ion current signal characteristics for onboard cycle-by-cycle, cylinder-by-cylinder measurement. The system may also control the engine operating parameters based on a predicted NOx emission level, CO emission level, $CO_2$ emission level, $O_2$ emission level, unburned hydrocarbon (HC) emission level, cylinder pressure, or a cylinder temperature measurement according to characteristics of the ion current signal.

20 Claims, 8 Drawing Sheets

(52) U.S. Cl.
CPC ..... *F02D 41/1459* (2013.01); *F02D 41/1461* (2013.01); *G01M 15/10* (2013.01); *F02D 41/1452* (2013.01); *F02D 41/1453* (2013.01)

(58) Field of Classification Search
CPC . F02D 41/1453; F02D 41/1452; G01M 15/10
USPC ............ 701/108, 109, 114, 115; 123/406.26, 123/435, 436, 676, 703; 60/274, 276, 60/285
See application file for complete search history.

(56) References Cited

U.S. PATENT DOCUMENTS

| | | | | |
|---|---|---|---|---|
| 3,903,853 A * | 9/1975 | Kizler | F02D 41/1482 | 123/688 |
| 3,908,366 A * | 9/1975 | Masaki | F01N 3/2053 | 340/579 |
| 4,308,519 A * | 12/1981 | Garcea | F02P 5/152 | 123/198 A |
| 4,359,893 A * | 11/1982 | Kizler | F02P 17/12 | 324/460 |
| 4,372,270 A * | 2/1983 | Latsch | G01N 27/68 | 123/703 |
| 4,380,986 A * | 4/1983 | Latsch | F02D 41/0065 | 123/687 |
| 4,426,987 A * | 1/1984 | Latsch | G01N 27/68 | 123/698 |
| 4,663,717 A * | 5/1987 | Kobayashi | F02D 41/1476 | 123/693 |
| 4,705,009 A * | 11/1987 | Asayama | F02D 41/0065 | 123/568.26 |
| 4,739,731 A * | 4/1988 | Habich | F02D 35/021 | 123/357 |
| 5,451,385 A * | 9/1995 | Hansel | B01D 53/8625 | 423/213.2 |
| 5,652,520 A * | 7/1997 | Kawamoto | F02P 17/12 | 324/388 |
| 5,673,804 A * | 10/1997 | Weiss | H01L 21/6773 | 212/274 |
| 5,734,094 A * | 3/1998 | Matsubara | G01N 27/626 | 324/402 |
| 5,801,534 A * | 9/1998 | Hohner | F02P 17/12 | 123/644 |
| 5,914,604 A * | 6/1999 | Bahr | F02P 3/0456 | 324/393 |
| 6,011,397 A * | 1/2000 | Yasuda | F02P 17/12 | 324/388 |
| 6,029,627 A * | 2/2000 | VanDyne | F02D 35/021 | 123/435 |
| 6,075,366 A * | 6/2000 | Yasuda | F02P 3/093 | 324/380 |
| 6,089,077 A * | 7/2000 | Daniels | F02D 35/021 | 73/35.03 |
| 6,098,013 A | 8/2000 | Mueller | | |
| 6,104,195 A * | 8/2000 | Yoshinaga | G01N 27/62 | 324/392 |
| 6,279,538 B1 * | 8/2001 | Herweg | F02D 35/021 | 123/406.26 |
| 6,279,539 B1 * | 8/2001 | Graves | F02M 57/025 | 123/458 |
| 6,311,672 B1 * | 11/2001 | Morishita | F02D 35/027 | 123/406.36 |
| 6,348,799 B1 * | 2/2002 | Herweg | F02D 35/021 | 324/459 |
| 6,375,828 B2 * | 4/2002 | Ando | F01N 3/0842 | 204/425 |
| 6,502,391 B1 * | 1/2003 | Hirota | F01N 3/0814 | 60/288 |
| 6,505,500 B1 * | 1/2003 | Elgh | F02D 35/021 | 73/112.05 |
| 6,550,312 B1 * | 4/2003 | Hohner | F02D 35/021 | 73/35.08 |
| 6,557,537 B2 * | 5/2003 | Ikeda | F02P 3/0838 | 123/606 |
| 6,646,230 B2 * | 11/2003 | Girlando | F23Q 7/001 | 123/145 A |
| 6,666,069 B2 * | 12/2003 | Raichle | G01L 3/26 | 73/114.08 |
| 6,725,834 B2 * | 4/2004 | Yorita | G01L 23/221 | 123/406.29 |
| 6,832,472 B2 * | 12/2004 | Huang | F02D 35/021 | 123/406.26 |
| 6,848,421 B1 * | 2/2005 | Karau | F02D 35/021 | 123/406.22 |
| 6,931,914 B2 * | 8/2005 | Dohi | G01L 23/225 | 73/35.08 |
| 6,986,342 B2 * | 1/2006 | Thomas | F01B 3/04 | 123/536 |
| 6,993,960 B2 * | 2/2006 | Benson | F23N 1/022 | 73/112.01 |
| 6,994,073 B2 * | 2/2006 | Tozzi | F02P 9/007 | 123/143 B |
| 7,043,353 B2 * | 5/2006 | Takemura | G01L 23/225 | 701/111 |
| 7,089,922 B2 * | 8/2006 | Lindner | F02D 41/146 | 123/673 |
| 7,096,722 B2 * | 8/2006 | Benson | F23N 5/123 | 73/114.08 |
| 7,204,133 B2 * | 4/2007 | Benson | F23N 1/022 | 73/112.01 |
| 7,318,411 B1 * | 1/2008 | Zhu | F02P 3/0456 | 123/406.14 |
| 7,472,687 B2 | 1/2009 | Zhu et al. | | |
| 7,877,195 B2 | 1/2011 | Angeby | | |
| 2002/0021120 A1 * | 2/2002 | Raichle | F02D 35/021 | 324/96 |
| 2002/0144539 A1 * | 10/2002 | Yorita | G01L 23/221 | 73/35.08 |
| 2003/0230074 A1 * | 12/2003 | Huang | F02D 35/021 | 60/285 |
| 2004/0025570 A1 * | 2/2004 | Dohi | G01L 23/225 | 73/35.08 |
| 2005/0150220 A1 * | 7/2005 | Johnson | F01N 3/025 | 60/295 |
| 2006/0016417 A1 * | 1/2006 | Kuo | F01L 1/34 | 123/294 |
| 2007/0079817 A1 * | 4/2007 | VanDyne | F02D 35/021 | 123/568.21 |
| 2008/0040020 A1 * | 2/2008 | Henein | F02D 35/021 | 701/109 |
| 2009/0132145 A1 * | 5/2009 | Angeby | F02D 35/02 | 701/102 |
| 2009/0159046 A1 * | 6/2009 | Moriya | F02D 35/023 | 123/435 |

FOREIGN PATENT DOCUMENTS

| | | |
|---|---|---|
| EP | 0 895 076 A3 | 10/1999 |
| EP | 1 132 601 A2 | 9/2001 |
| EP | 1 559 888 A2 | 8/2005 |
| WO | WO 2013/130744 A1 | 9/2013 |

OTHER PUBLICATIONS

Supplementary European Search Report for Application No. 1375478.8 dated Jun. 17, 2015.

* cited by examiner

USING ION CURRENT SIGNAL FOR ENGINE PERFORMANCE AND EMISSIONS MEASURING TECHNIQUES AND METHOD FOR DOING THE SAME

CROSS REFERENCE TO RELATED APPLICATIONS

This application is a 371 national stage application of PCT Application No. PCT/US2013/028231, filed Feb. 28, 2013, which application claims the benefit of U.S. Provisional Patent Application No. 61/604,074 filed Feb. 28, 2012, the content of which is hereby incorporated by reference in its entirety.

BACKGROUND

1. Field of the Invention

The present application relates to the use of the characteristics of an ion current sensor signal for onboard measurement of engine emissions such as $NO_R$, CO, $CO_2$, unburned hydrocarbon (HC), excess O2 in the exhaust and for onboard measurement of cylinder pressure and temperature and for the control of different engine parameters accordingly.

2. Description of Related Art

One existing technology in measuring NOx emissions utilizes a chemiluminescence detector (CLD) that samples gases to a chamber full with ozone (O3), where the chemical reaction between NO and O3 takes place producing luminescence proportional to the NO concentration. The CLD method is used only in research or during engine calibration and development as it requires very expensive instrumentation and maintenance. Another existing technology a sensor located in the exhaust pipe or with after treatment device which consists of Zirconia multilayer ceramics in metal housing. The NOx concentration in the exhaust gas is proportional to the electrical current controlling the electrochemical pumps that adjusts the oxygen concentration in the cavities of the sensing element. The problem of this type of sensor is their slow time response and low sensitivity, and it requires recalibration due to signal drafting. Further, this type of sensors is unable to predict the concentration of NOx attributable to each engine cylinder accurately. This brings us to the conclusion that there is no in-cylinder, low cost technology that is capable of quantitatively and adequately predict the concentration of NOx produced in internal combustion engines.

Regarding CO, $CO_2$, and unburned hydrocarbon (HC), there is no in-cylinder onboard sensor available to predict these emissions produced by the engine. As for excess O2 in the exhaust, one known sensor is the lambda sensor which is currently used by the auto industry. However, the use of the ion current sensor to predict excess O2 is a faster technology as the predictions are based on a cycle by cycle basis.

For cylinder pressure and temperature, pressure transducers are considered for this type of measurements. As cylinder pressure is measured and cylinder temperature is then calculated from the pressure trace. This is a reliable technology, however, the cost of a pressure transducer is still high compared to the use of the ion current sensor to predict cylinder pressure and temperature.

SUMMARY

A system and method is provided for an onboard in-cylinder pressure, temperature, and emissions measurements in an internal combustion engine. The system can be further used in controlling the engine based on a feedback signal from the measured parameters. The system acquires an ion current signal and controls the engine operating parameters based on the characteristics of the ion current signal.

Throughout the application examples will be provided with regard to NOx, pressure and temperature measurements, however, these principles can be applied to other in-cylinder variables as well and such applications are contemplated herein. In this application, it is understood that NOx refers to various emissions comprising Nitrogen and Oxygen, such as but not limited to NO and $NO_2$.

The new technique gives the ion-current sensor, located inside the engine cylinder, the ability to detect and accurately measure the amount of different combustion resulted species on a cyclic basis. This fast response measuring technique can be applied in all engine cylinders in order to provide an onboard feedback signal to the contribution of each cylinder to certain emissions production.

The system offers a new cost effective and simple technique to measure pressure, temperature, and certain emissions inside the combustion chamber using the ion-current signal. The system also provides a fast cycle-by-cycle predictive technique to accommodate the engine transient operation. The feedback signal is sent to the engine ECU for better engine control, thereby producing less emissions with no modification to the engine.

The system is cost effective as the sensor involved is the ion sensor. The system provides a fast response emissions and engine performance measuring technique, as it depends on electron speed. The system is able to measure the disclosed parameters inside the combustion chamber and on a cycle-by-cycle basis. Further, the system is able to measure these parameters in every engine cylinder with no modifications required to the engine block. Accordingly, the system is well suited as an on-board tool for NOx, CO, $CO_2$, unburned hydrocarbon (HC), excess O2, cylinder pressure and temperature measurement and provides an efficient, compact design for integration in production models.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

Aspects of this application will be described by way of examples with reference to the accompanying drawings. They serve to illustrate several aspects of the present application, and together with the description provide explanation of the system principles. In the drawings.

DETAILED DESCRIPTION

Figure 1:
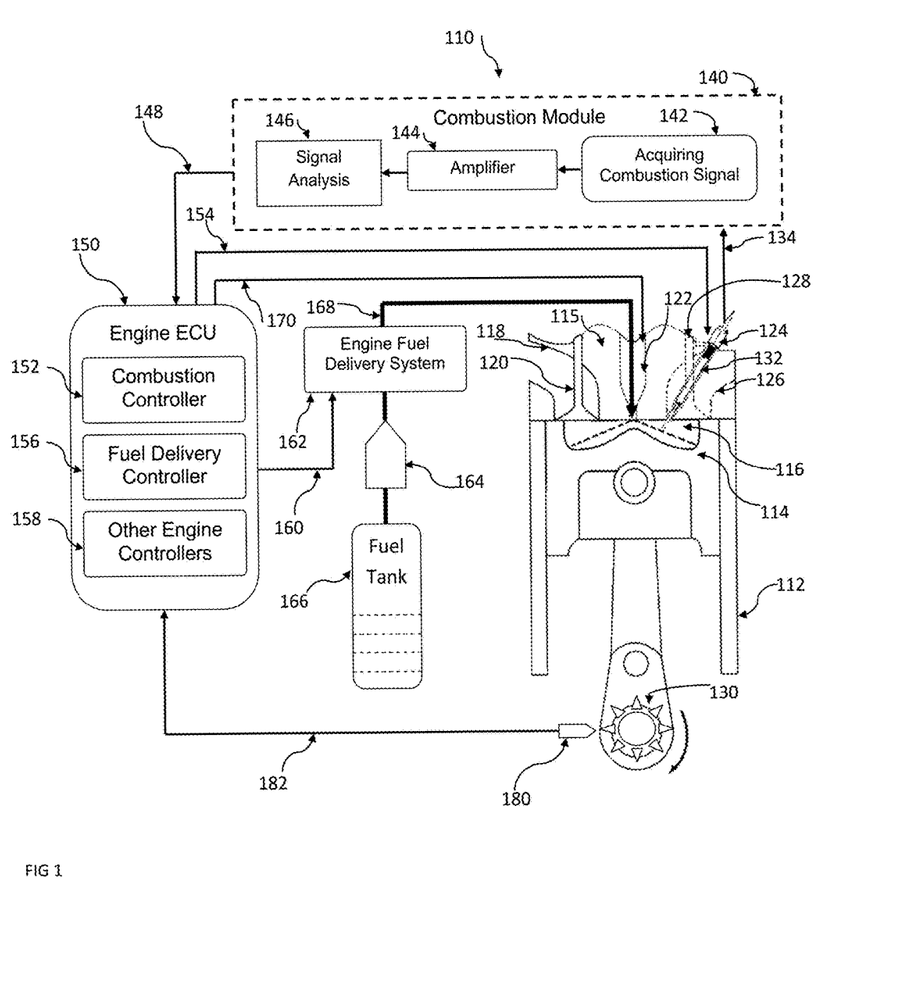
FIG. 1 is an engine system for controlling engine operating parameters based on ion sensor signal characteristics.

Now referring to FIG. 1, a schematic view of an engine 110 is provided. For illustrative purposes the schematic shows a single cylinder of an engine, however, it is readily understood that multiple cylinders may be used in combination to form the engine. The cylinder 112 houses piston 114 allowing for reciprocating motion of the piston 114 within the cylinder 112. The combustion chamber 116 is formed by the cylinder houses 112, the piston 114, and the cylinder head 115. Air, a mixture of air and exhaust gases, or other mixtures of any fluid may be provided into the chamber 116 through an intake manifold 118. The flow of air or mixtures made through the intake manifold 118 may be controlled by intake valve 120. Fuel may be provided into the chamber by a fuel injector 122. A spark plug 124 may is used to ignite of the fuel inside the combustion chamber 116 causing reciprocating motion of the piston 114. After combustion, the exhaust gases in the chamber may be released through the exhaust manifold 126. Further, the flow of exhaust may be controlled by an exhaust valve 128 located within the exhaust manifold 126. As may be readily understood, combustion in the chamber 116 causes the piston 114 to move downward causing rotation of the crankshaft 130. The inertia of a flywheel or combustion in other chambers will cause the crankshaft 130 to rotate further thereby causing a reciprocating motion of the piston 114 upward. The spark plug 124 can be turned on by the ECU 150 through an electrical command 154. The spark plug 124 may also include a sensor 132 to monitor activity within the combustion chamber 116 during the entire cycle of the engine. The sensor 132 includes an ion current sensor, a pressure sensor, an optical sensor, or any combination of the above. These sensors may be standalone or integrated with the spark plug or the fuel injector 122. Although certain aspects may be particularly useful for spark ignited engines, the application of this technology with regard to other internal combustion engines such as diesel engines is contemplated herein. In such scenarios, the ion current sensor may be placed within a glow plug. The sensor signal 134 may be provided to a combustion module 140. The combustion module 140 includes an acquisition module 142 for acquiring the combustion signal and amplifier 144 for enhancing the combustion signal and a signal analysis module 146 to determine certain combustion characteristics based on the enhanced combustion signal. The combustion parameters 148 are then provided to an engine control module 150. The engine control module 150 may then analyze the combustion parameters and control engine operation parameters based on the combustion parameters. In one implementation, the ion current signal may be used to control the engine operating parameters.

The engine control unit 150 includes a combustion controller 152, a fuel delivery controller 156 and other engine controllers 158. The combustion controller 152 may act as a master module that provides a control signal to different engine components such as the spark plug 124 (ignition system), the fuel delivery system 162, or the injector 122. The fuel delivery controller 156 provides a fuel delivery control signal 160 to an engine fuel delivery system 162. The engine fuel delivery system controls the delivery of fuel to the injector 122. The fuel from the tank 166 is delivered by the fuel pump 164 to the fuel delivery system 162. The fuel delivery system 162 distributes the supplied fuel based on a signal 160 from the ECU 150. The fuel is further supplied to the injector 122 through a fuel line 168. In addition, the fuel delivery controller 156 is in communication electronically with the fuel injector 122 to control different injection parameters such as number of injection events, injection duration and timing as noted by line 170. In addition, the other engine controllers 158 control other engine parameters such as engine speed, load, amount of exhaust gas recirculation, variable geometry turbocharger, or other units installed to the engine. Further, an output sensor 180 may be in communication with the crankshaft 130 to measure crank shaft position, and engine speed, torque of the crankshaft, or vibration of the crank shaft, and provide the feedback signal to the engine control unit 150 as denoted by line 182.

Figure 2:
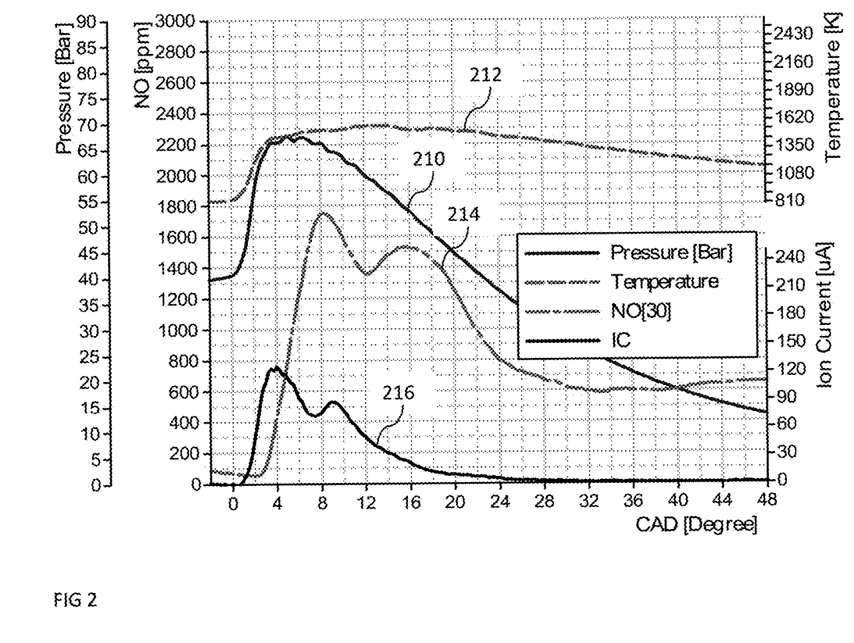
FIG. 2 is a graph illustrating the ion current, NOx, temperature and pressure for an engine at cycle number 30.

Referring to FIG. 2, a graph is provided of the pressure, temperature, NOx, and corresponding ion current for an engine at cycle number 30. Line 210 is the temperature and line 212 is the pressure in cylinder. Line 214 is the in-cylinder NOx measured using a fast NOx machine using an in cylinder sampling probe, while line 216 is the ion current profile. A high correlation between in-cylinder NOx and ion current profiles are apparent. In particular, it can be noticed that the peaks in the profile are the same in number and have similar spacing and relative amplitudes. In addition, the ion current signal is also affected by the cylinder pressure and temperature resulted from the combustion process.

Figure 3:
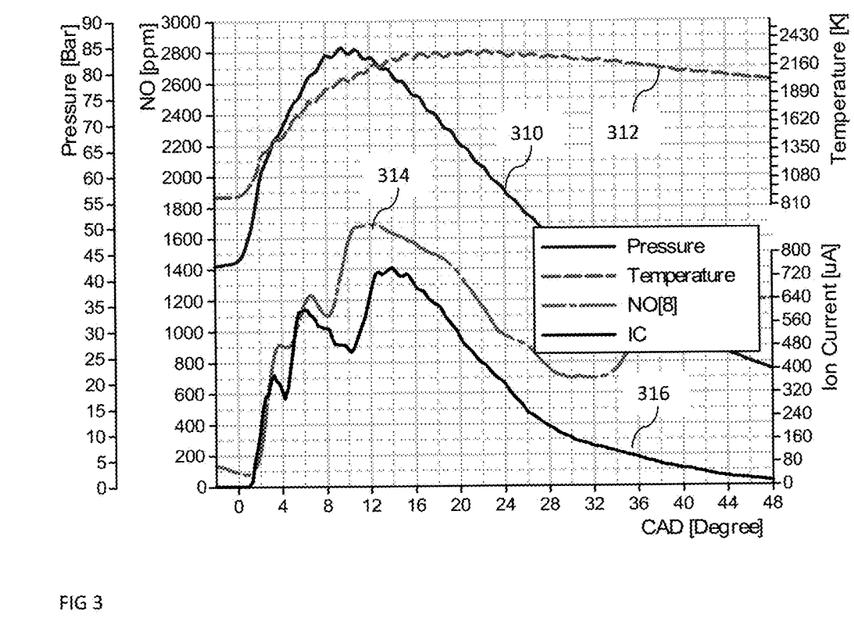
FIG. 3 is another graph illustrating the ion current, NOx, temperature and pressure for an engine at cycle number 8.

Referring to FIG. 3, a graph is provided of the pressure, temperature, NOx, and corresponding ion current for an engine at cycle number 8. Line 310 is the temperature and line 312 is the pressure in cylinder. Line 314 is the NOx, while line 316 is the ion current profile. Again, a correlation between the NOx and the ion current profile is apparent. In particular, it can be noticed that in this instance the NOx and ion current profiles have three peaks and also have similar spacing and relative amplitudes. It can be observed also that the ion current signal amplitude increased with the increasing cylinder pressure and temperature if compared with the previous graph shown in FIG. 2.

Figure 4:
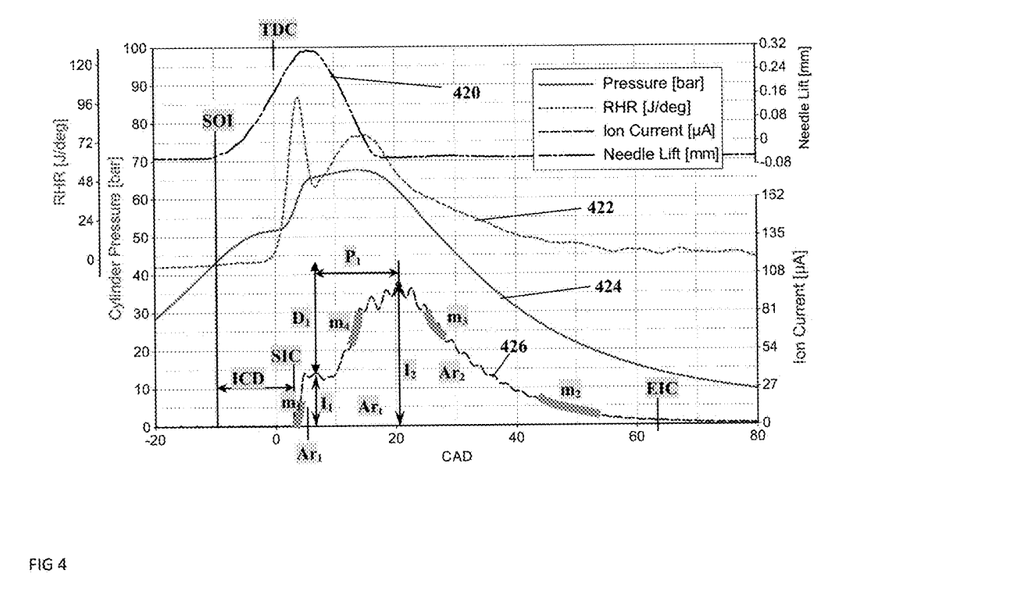
FIG. 4 illustrate the analysis of the ion current signal.

Now referring to FIG. 4, a graph of the pressure trace 424, rate of heat release 422, needle lift signal 420, and ion current signal 426 is provided. Ion current signal parameters are shown in the graph to illustrate an algorithm to control engine operating parameters and indicate in-cylinder variables such as NOx, CO, $CO_2$, unburned hydrocarbon (HC), excess O2, cylinder pressure and temperature based on the ion current signal. As examples of the parameters deduced from the ion current signal, the start of ion current signal (SIC) timing, which may be accomplished by various thresholding techniques, the ion current slope ($m_1$, $m_2$, $m_3$, $m_4$), where $m_1$ refers to the rate of ion current rise, $m_2$ is the rate of ion current decay, $m_3$ is the rate of the second peak decay, and $m_4$ is the rate of the ion current second peak rise.

More slopes may be added depending on the number of peaks of each cycle-to-cycle ion current signal. The slope may be determined as the slope at which the ion current signal crosses an ion current threshold or may be the slope of the ion current signal at a specific position in degrees of the cycle. In some implementations, the slope may be determined at an offset position relative to an event such as the beginning of the ion current signal, the beginning of an ignition event, or some other characteristic marker of the cycle of the cylinder in which the ion current is measured. Further, the slope may be an instantaneous slope or may be an average slope, for example over a few degrees. The ion current delay (ICD) is another ion current parameter which is determined by a reference point which can be but not limited to the SOI (Start of Injection) (for example, as sensed by ECU) or the TDC (Top Dead Center) (for example, as sensed by the cam shaft sensor). Another parameter is the ion current amplitude ($I_1$, $I_2$, $I_3$, ..., $I_n$ in case of different peaks) for example, the first peak $I_1$ and second peak $I_2$. The difference between two consecutive amplitudes ($D_1$, ..., $D_n$ in case of different peaks). The ion current peak to peak distance ($P_1$, ..., $P_n$ in case of many peaks). The end of ion current signal timing (EOI), which may be accomplished by various thresholding techniques, and the total area under the curve (Ar) of the ion current signal, the area under the first bump ($Ar_1$), and the area under the second bump ($Ar_2$), and ($Ar_n$) for the area under the bump (n). Other parameters may be derived and will become readily apparent to persons skilled in the art In one example, the relationship used to come up with measured parameters may be expressed as predicted parameter $NO_x$=A*Fn(SOI)+B*Fn(m)+C*Fn(I)+L*Fn(P)+E*Fn(ICD)+F*Fn(Ar)+H*Fn(EOI)+K*Fn(D)+Y*Fn (SOI,m)+X*Fn (SOI, m, I)+ ... etc. While the forgoing equation is exemplary, additional variables may be readily introduced. Such variables may include peak to peak, peak to end, peak to start, peak to start of injection, peak to top dead center, peak to end of injection, peak to start of combustion, peak amplitudes for each peak, or any of the other parameters mentioned herein and each of those variable may have their own weighting as indicated above. In addition, weighting factors such as A, B, C, L, E, F, H, K, Y, ..., X may constants or may vary according to a look up table based on other parameters such as ion current sensor location inside the combustion chamber or the combustion chamber geometry. Further, it is anticipated that other relationship functions may be developed including linear, quadratic, root, trigonometric, exponential or logarithmic components or any combination thereof. In one particular example in accordance with the general equation provided above, NOx could be predicted according to a function:

NOx=A0+A1(Par1)+A2(Par2)+A3(Par3)+A4(Par4)+
A5(Par1*Par2)+A6(Par1*Par3)+A7(Par1*Par4)+
A8(Par2*Par3)+A9(Par2*Par4)+A10
(Par1*Par2*Par3)+A1l(Par1*Par3*Par4)+A12
(Par1^2*Par2^2*Par3^2*Par4^2)

where (Par) stands for an ion current parameter and (A) is a coefficient or weighting.

Figure 5:
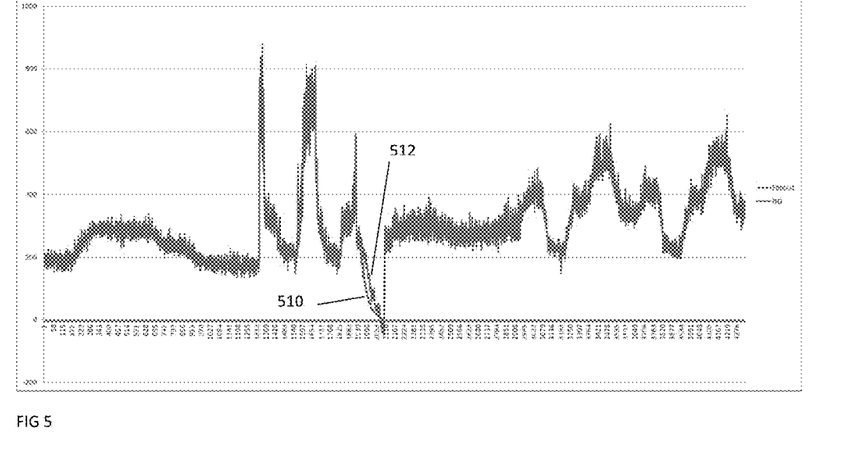
FIG. 5 is a graph illustrating the comparison between the measured NOx and the predicted NOx based on the analysis of the ion current signal using a full accessed open engine control unit.

Now referring to FIG. 5, this graph illustrates the cycle-to-cycle NOx measurements for an engine transient operation at different engine operating conditions. As such, the graph represents a comparison between the NOx measured from the engine and the NOx predicted by the new technique depending on the function mentioned above. Line 510 represents the measured NOx percentage while line 512 represents the expected NOx calculated by the algorithm according to the ion current signal.

From the graph, it is clear that a good correlation between the measured NOx and the predicted NOx is achieved. The test was conducted based on a transient engine operating condition where engine operating parameters such as speed and load were varying. The engine was operated in transient test via an open ECU.

Figure 6:
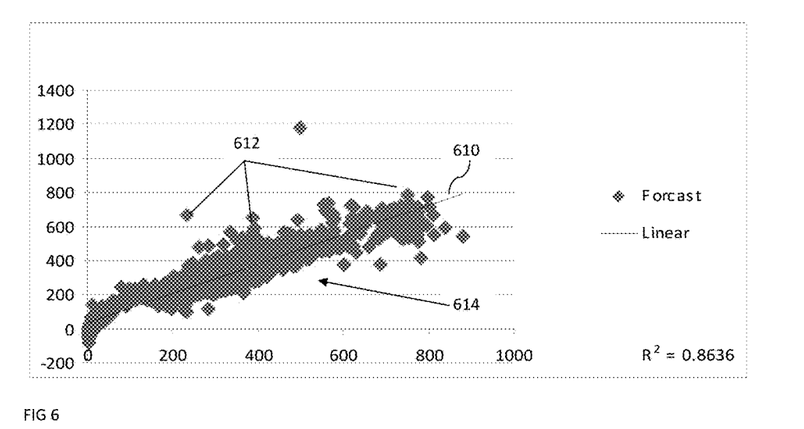
FIG. 6 is a graph illustrating the correlation between measured NOx and the predicted NOx.

FIG. 6 is a graph illustrating the correlation of the measured NOx and the predicted NOx as the engine operating parameters are varied. The x-axis of the graph is the measured NOx value and the y-axis of the graph is the predicted NOx value based on the ion current signal. Markers 612 are sample points that form a data cloud 614. Line 610 is a linear fit based on the samples in the data cloud 614. The linear correlation of the predicted NOx to the measured NOx is 93%.

Figure 7:
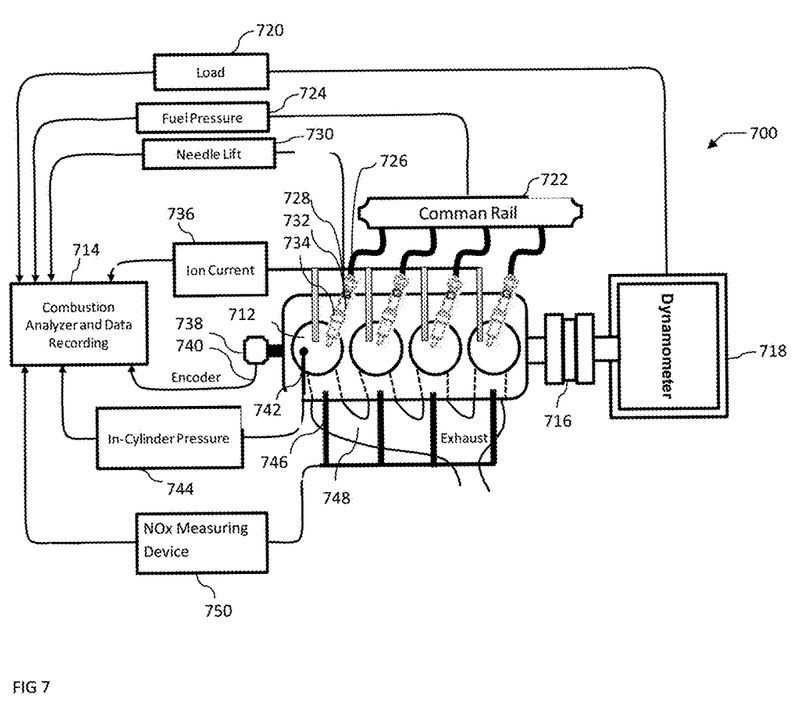
FIG. 7 is a schematic view of an experimental engine layout used to collect the data in the previous graphs and determine the analysis algorithm.

Now referring to FIG. 7, a system is provided for determining the calibration between the ion current signal and the measured cylinder pressure, temperature, and NOx percentage in the exhaust. The experiments in FIGS. 1, 2, 4, 5, 6, 10, and 11 were conducted on a multi-cylinder engine. The engine is equipped with a common rail injection system and a turbocharger. The engine specifications are shown in Table 2.

TABLE 2

| | |
|---|---|
| No. of Cylinder | 4 |
| Displacement (L) | 4.5 |
| Bore × Stroke (mm) | 106 × 127 |
| Connecting Rod (mm) | 203 |

The engine system 700 includes an engine 710 with four cylinders 712. Pistons reciprocate in the cylinders 712 to drive the crankshaft 716. The crankshaft 716 may be connected to a dynamometer 718. The dynamometer provides a load signal 720 to a processor 714 for combustion analyzing and data recording. Fuel is provided to the engine through a fuel rail 722, pressure may be monitored in the fuel rail by a fuel sensor which may provide a fuel pressure signal 724 to the processor 714. The fuel may be provided from the fuel rail 722 to the cylinder 712 through a fuel line 726. The fuel may be provided through a fuel needle 728. As such a needle lift signal 730 may be provided to the processor 714 for further analysis in conjunction with the other engine operating parameters. Further, a fuel flow meter is embedded within the fuel line 726 and is used to measure the fuel flow representing engine fuel consumption. It is understood that different fuel measurement devices could be used in this scenario.

Further, an ion current sensor 734 which may be the fuel injector or the spark plug or any electrically insulated probe may be located within the cylinder 712 to measure ion current. The ion current signal 736 may be provided to the processor 714 from the ion current sensor 734. In addition, an inlet cylinder pressure sensor 742 may be located within the cylinder to measure cylinder pressure. The cylinder pressure signal 744 may be provided to the processor 714 by the pressure sensor 742. The processor 714 uses the cylinder pressure signal 744 to calculate the cylinder temperature. Indicated Mean Effective Pressure (IMEP) and Brake Mean Effective Pressure (BMEP) for each engine cylinder is also calculated. It is understood that NOx, CO, $CO_2$, unburned hydrocarbon (HC), excess O2, cylinder pressure and temperature can be predicted using the ion current signal by the processor 714. Further, crank position sensor 738 may be connected to the crankshaft to provide an encoder signal 740 to the processor 714, to track the various engine parameters based on the engine crank angle. In addition, a NOx measurement device 746 may be provided in an exhaust outlet 748 for each cylinder 712. A NOx measurement signal 750 may be provided to the processor 714 by the NOx measurement device 746. A lambda sensor is also available in the exhaust outlet 748 to measure excess oxygen. In addition, fast $CO/CO_2$ and unburned HC measurement devices are placed in the exhaust outlet 748 and used to provide a signal to the processor 714.

Figure 8:
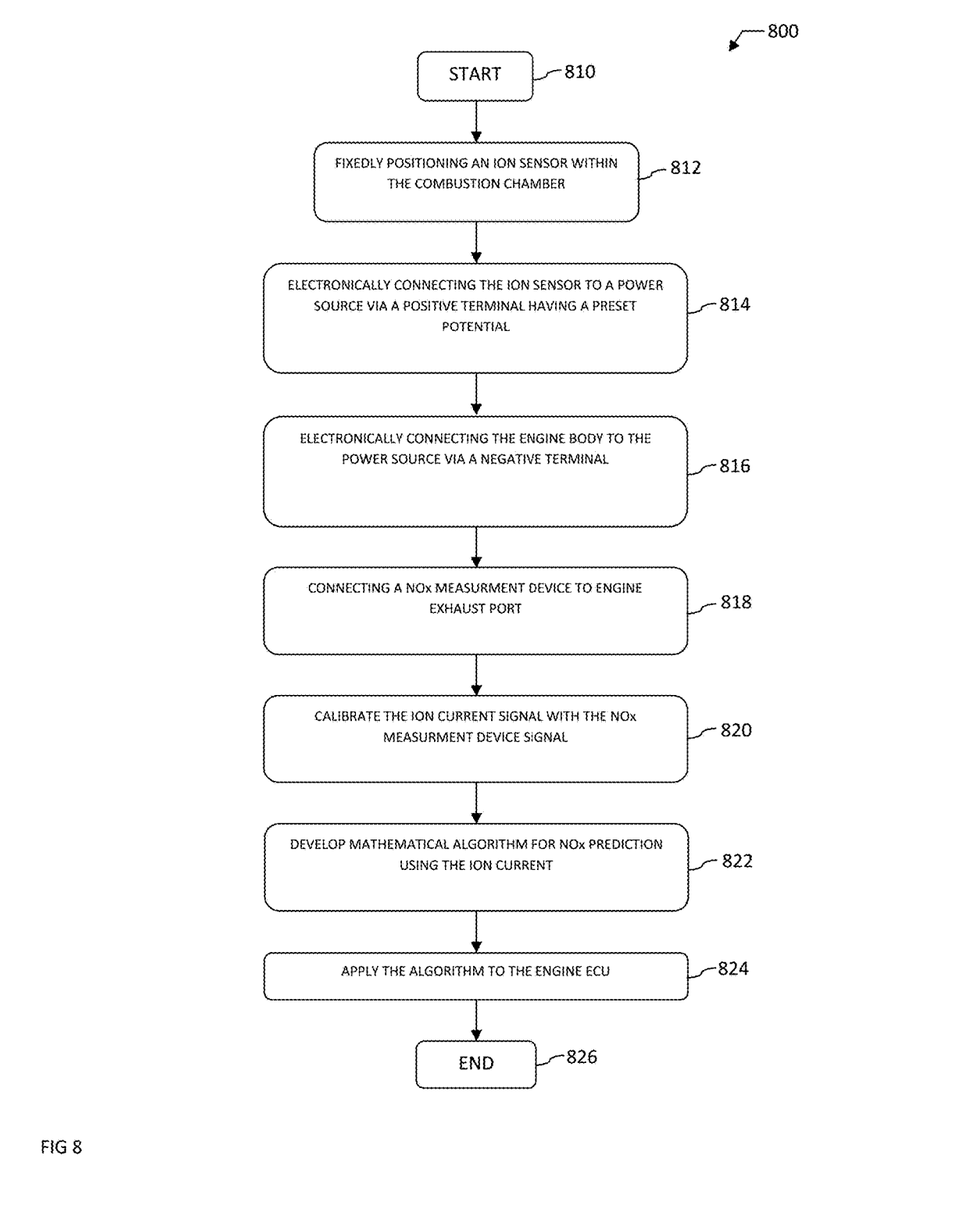
FIG. 8 shows a flow chart of a calibration procedure to predict the amount of NOx based on the ion current signal.
Figure 9:
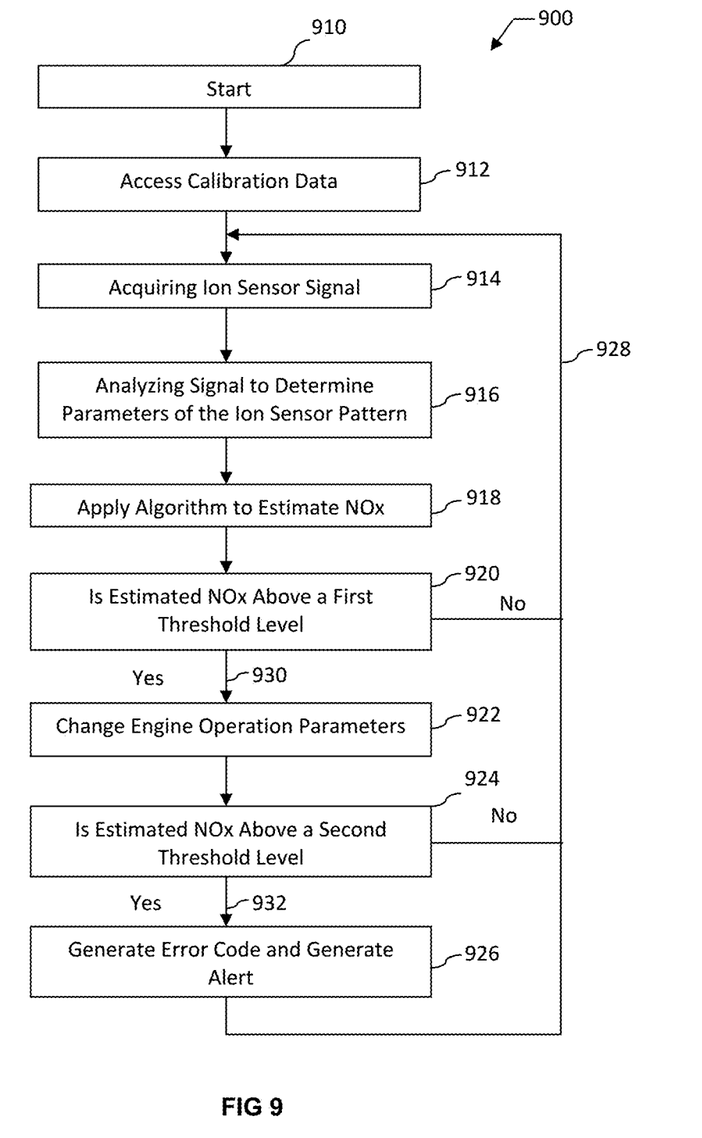
FIG. 9 is a flow chart of a method for controlling the engine based on the ion current signal characteristics.

Now referring to FIG. 8, a flow chart of a calibration procedure for NOx measurement using the ion current signal is provided. The method starts in block 810. In block 812, an ion sensor is positioned within the combustion chamber. In block 814, the ion sensor is electrically connected to a power source through a positive terminal having a preset potential. In block 816, the engine body is connected to the power source through a negative terminal. In block 818, the NOx measurement device is connected to the engine exhaust port for measuring the actual NOx. In block 820, the ion current signal is analyzed and calibrated with the NOx measurement device signal. In block 822, a mathematical algorithm is developed for NOx prediction using the ion current signal. In block 824, the algorithm is stored in a storage device for application to the engine control unit. The method ends in block 826. The same calibration procedure may be used for the other disclosed parameters such as CO, $CO_2$, unburned hydrocarbon (HC), excess O2, cylinder pressure and temperature Now referring to FIG. 9, a method for controlling engine parameters based on the ion current signal characteristics is provided. The method 900 starts in block 910. In block 912, the calibration data is accessed by the engine control unit. In block 914, an ion sensor signal is acquired. In block 916, the ion sensor signal is analyzed to determine the weighting factors of the ion sensor pattern. In block 918, the NOx prediction algorithm is applied to the ion sensor signal characteristics to estimate the amount of NOx during its formation in the combustion chamber. If the estimated NOx is not above a first threshold level, the method follows line 928 to block 914, where the ion sensor signal is acquired again. If the estimated NOx is above a first threshold level, the method follows line 930 to block 922. In block 922, the engine control unit may change engine operation parameters of the engine to reduce the amount of NOx. In block 924, the engine control unit determines if the estimated NOx is above a second threshold level. If the estimated NOx is not above a second threshold level, the method follows line 928 to block 914 where the ion sensor signal is acquired again and the method continues. If the estimated NOx is above the second threshold level, the method follows line 923 to block 926. In block 926, an error code is generated and/or an alert is provided to the user noting that the engine is experiencing emission problems outside of an acceptable range. The method then follows line 928 back to block 914 where the method continues.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Figure 10:
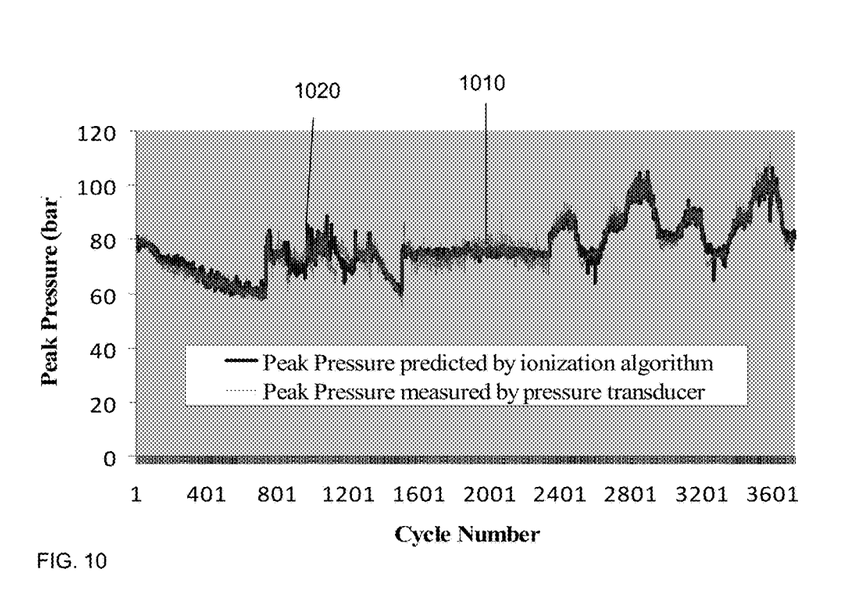
FIG. 10 is a graph illustrating the comparison between the measured in-cylinder pressure using a pressure transducer and the predicted in-cylinder pressure based on the analysis of the ion current signal using a full accessed open engine control unit.

Now referring to FIG. 10, this graph illustrates the cycle-to-cycle in-cylinder pressure measurements for an engine transient operation at different engine operating conditions. As such, the graph represents a comparison between the cylinder pressure measured using a pressure transducer and the cylinder pressure predicted by the new technique depending on the function mentioned above. Line 1010 represents the measured cylinder pressure while line 1020 represents the predicted cylinder pressure calculated by the algorithm according to the ion current signal.

Figure 11:
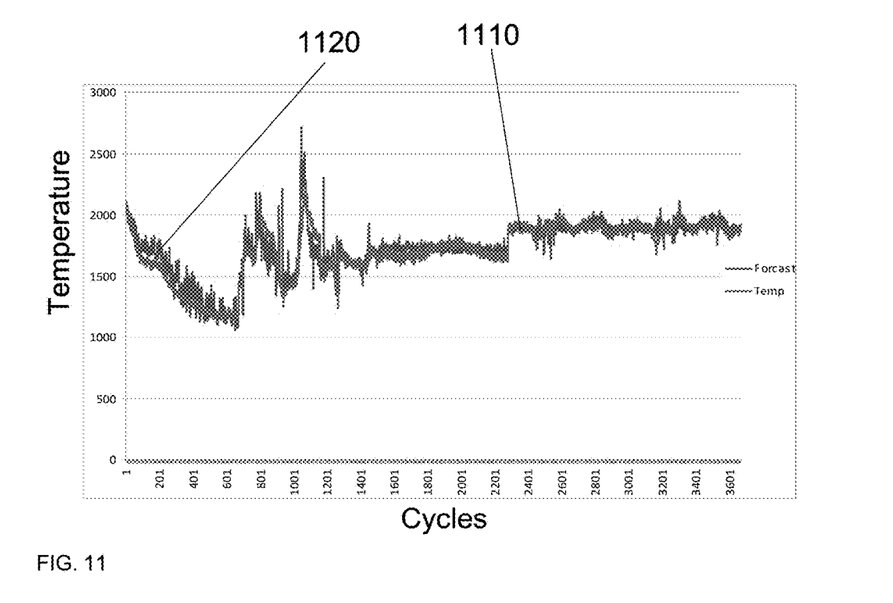
FIG. 11 is a graph illustrating the comparison between the calculated in-cylinder temperature obtained from a combustion analyzer using a pressure transducer and the predicted in-cylinder temperature based on the analysis of the ion current signal using a full accessed open engine control unit.

Now referring to FIG. 11, this graph illustrates the cycle-to-cycle in-cylinder temperature for an engine transient operation at different engine operating conditions. As such, the graph represents a comparison between the cylinder temperature calculated from a measured cylinder pressure signal and the cylinder temperature predicted by the new technique depending on the function mentioned above. Line 1110 represents the calculated cylinder temperature while line 1120 represents the predicted cylinder temperature based on the ion current signal algorithm.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A system for controlling an internal combustion engine, the system comprising an ion current sensor and a control unit in communication with the ion current sensor for receiving an ion current signal, the control unit being configured to predict for each cylinder during each cycle at least one of an NOx emission level, a CO emission level, a $CO_2$ emission level, an $O_2$ emission level, and an unburned hydrocarbon (HC) emission level based on a start of ion current and a ion current delay.

2. The system according to claim 1, wherein the control unit is configured control engine operating parameters based on the predicted at least one of a CO emission level, a $CO_2$ emission level, an $O_2$ emission level, and an unburned hydrocarbon (HC) emission level from the ion current signal.

3. The system of claim 1, wherein the control unit is configured to control engine operating parameters based on a function of one or multiple ion current signal parameters according to the predicted at least one of a CO emission level, a $CO_2$ emission level, an $O_2$ emission level, and an unburned hydrocarbon (HC) emission level.

4. The system of claim 1, wherein the control unit is configured to control engine operating parameters based on the sum of multiple functions of one or a combination of multiple ion current signal parameters.

5. The system of claim 1, wherein the control unit is configured to control engine operating parameters based on the sum of multiple functions of one or a combination of multiple ion current signal parameters, wherein each function is weighted prior to summing.

6. The system of claim 1, wherein the control unit is configured to control different engine parameters including at least one of fuel system parameters, air system parameters, ignition system parameters, turbo-charging and super-charging system parameters, valve train system parameters, EGR (exhaust gases recirculation) system parameters, and after-treatment system parameters based on a function of one or more or a combination of ion current signal parameters.

7. The system of claim 1, wherein the ion current sensor is integrated within spark plug, engine gasket, fuel injector, or any electrically insulated probe.

8. The system of claim 1, wherein the control unit determines a predicted HC measurement based on a function of one or more or a combination of ion current signal parameters and the control unit is configured to adjust the engine operating parameters if the predicted HC measurement is above a first threshold.

9. The system of claim 8, wherein the control unit is configured to generate an error code and or alert if the predicted HC measurement is above a second threshold.

10. The system according to claim 1, wherein the control unit is configured to control engine parameters according the predicted at least one at least one of a CO emission level, a $CO_2$ emission level, an $O_2$ emission level, an unburned hydrocarbon (HC) emission level based on ion current signal parameters, comprising at least one of a slope of the ion current signal and area under the curve of the ion current signal.

11. A method for controlling an internal combustion engine, the method comprising acquiring an ion current signal and controlling engine operating parameters based on a function of one or more or a combination of ion current signal parameters according to an at least one of an NOx emission level, a CO emission level, a $CO_2$ emission level, an $O_2$ emission level, an unburned hydrocarbon (HC) emission level based on a start of ion current and a ion current delay.

12. The method of claim 11, wherein the engine operating parameters are controlled based a function of one or more or a combination of ion current signal parameters.

13. The method according to claim 11, wherein the at least one of a CO emission level, a $CO_2$ emission level, an $O_2$ emission level, an unburned hydrocarbon (HC) emission level, a cylinder pressure, and a cylinder temperature are predicted based on ion current signal parameters, comprising, a slope of the ion current signal and area under the curve of the ion current signal.

14. The method according to claim 11, wherein controlling engine operating parameters is based on a function of one or more or a combination of ion current signal parameters according to a CO emission level.

15. The method according to claim 14, wherein the CO emission level is predicted based on ion current signal parameters comprising at least one of a slope of the ion current signal and area under the curve of the ion current signal.

16. A method for controlling an internal combustion engine, the system comprising an ion current sensor and a control unit in communication with the ion current sensor for receiving an ion current signal, the control unit being configured to predict for each cylinder during each cycle at least one of an NOx emission level, a CO emission level, a $CO_2$ emission level, an $O_2$ emission level, an unburned hydrocarbon (HC) emission level based on a function of the ion current delay between the start of injection and the start of ion current.

17. The method according to claim 16, wherein the at least one of a CO emission level, a $CO_2$ emission level, an $O_2$ emission level, an unburned hydrocarbon (HC) emission level is a corresponding CO, $CO_2$, $O_2$, HC profile.

18. The method according to claim 16, wherein the control unit is configured to predict a $O_2$ emission level based on the ion current signal.

19. The method according to claim 18, wherein the HC emission level is a HC profile, and the HC profile is predicted based on ion current signal parameters, comprising at least one of a slope of the ion current signal and area under the curve of the ion current signal.

20. A system for controlling an internal combustion engine, the system comprising an ion current sensor and a control unit in communication with the ion current sensor for receiving an ion current signal, the control unit being configured to predict at least one of an NOX emission level, a CO emission level or a $CO_2$ emission level, an $O_2$ emission level, and an unburned hydrocarbon (HC) emission level for each cylinder during each cycle based on an ion current delay and a rate of second peak decay.

* * * * *